United States Patent [19]
Milton

[11] 3,866,753
[45] Feb. 18, 1975

[54] BOTTLE HEIGHT INSPECTION APPARATUS

[75] Inventor: Colin Milton, Thornton, Colo.

[73] Assignee: Columbine Glass Company, Inc., Wheat Ridge, Colo.

[22] Filed: Sept. 26, 1973

[21] Appl. No.: 400,890

[52] U.S. Cl. .................. 209/73, 209/75, 209/80, 209/82, 209/81 A
[51] Int. Cl. ............................................. B07c
[58] Field of Search ........ 209/73, 74, 75, 82, 111.8, 209/80, 81 A; 324/34 PS

[56] References Cited
UNITED STATES PATENTS
3,392,829  7/1968  Keinanen .................. 209/111.8 X
3,422,542  1/1969  Spurr ............................. 209/80 X
3,464,547  9/1969  Becker ........................... 209/82 X

*Primary Examiner*—Allen N. Knowles
*Attorney, Agent, or Firm*—Wm. Griffith Edwards

[57] ABSTRACT

A machine for testing the finish of bottles in a production line includes a device for the concurrent testing of the height of the bottles and for ejecting bottles not within a predetermined height range. A magnetic sensing device is employed for detecting the off-height bottles and operates in response to movements of the finish testing head.

6 Claims, 7 Drawing Figures

PATENTED FEB 18 1975 3,866,753

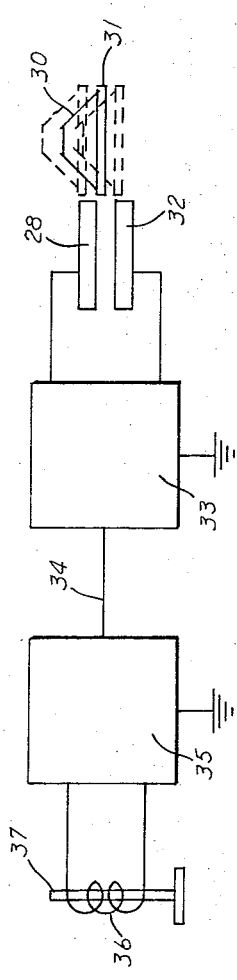
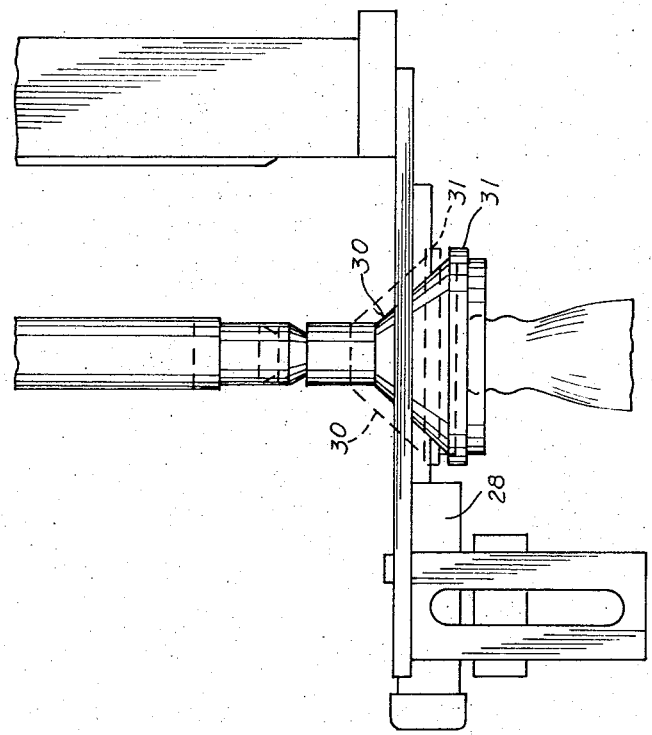
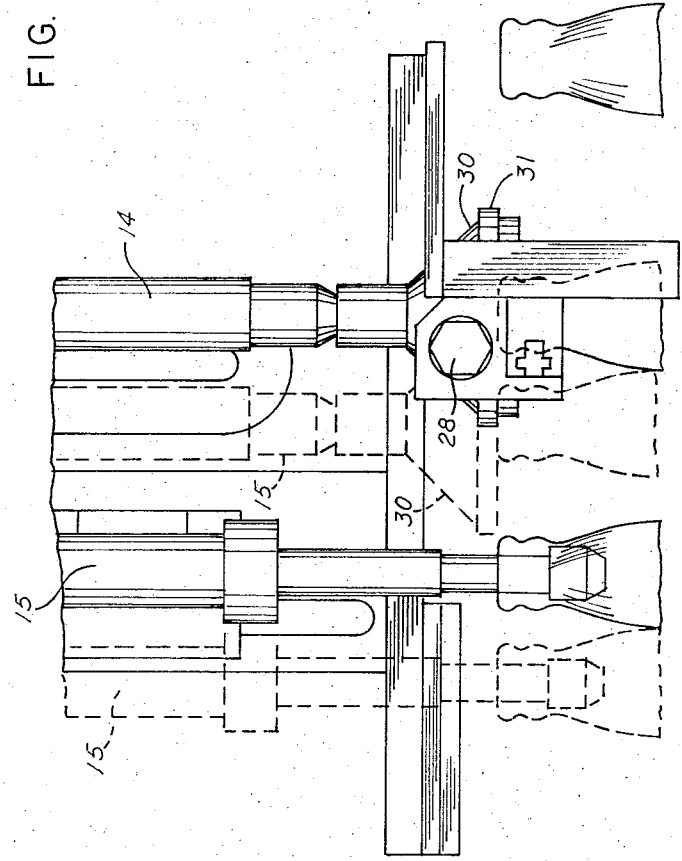

BOTTLE HEIGHT INSPECTION APPARATUS

My invention relates to the automatic testing of characteristics of bottles moving in a production line and particularly to an improved device for testing the height of the bottles and ejecting bottles outside a required height range.

In the quantity production of bottles and particularly glass bottles, equipment is provided along the advancing line of bottles for testing the physical characteristics of the bottles and ejecting from the line those bottles which do not meet set standards. In the manufacture of glass bottles which are to receive sealing caps it is necessary to test the finish and perfection of configuration of the sealing area of each bottle. Machines are presently provided which include a pressure head which is brought into sealing engagement with each bottle in turn, and operates a mechanism to eject any bottle which fails to effect a seal while in engagement with the test head. Bottles may also be defective because they do not meet height standards and accordingly it is an object of my invention to provide a bottle testing device including an improved arrangement for detecting and ejecting from a production line all bottles which do not meet predetermined height standards.

It is another object of my invention to provide in an apparatus for testing the finish of glass bottles an improved device for the concurrent detection and ejection of all bottles not meeting required height standards.

Briefly, in carrying out the objects of my invention in one embodiment thereof, I provide a magnetic detection device mounted on a production line bottle finish testing machine in a position such that it lies closely adjacent the testing head during its lateral testing stroke while in engagement with each bottle. A magnetic probe is arranged in a position out of the normal path of the testing head when in engagement with bottles of heights within the permissible range. When the test head is in engagement with a bottle of abnormal height, a magnetic element thereon passes within the sensing field of the probe and thereby activates the bottle ejection device to remove the defective bottle from the line. The same ejection device may be employed for ejection of bottles failing either the finish or the height test.

The features of novelty which characterize my invention are pointed out with particularity in the claims annexed to and forming a part of this specification. My invention itself, however, both as to its organization and its manner of operation, together with further objects and advantages thereof may best be understood by reference to the following description taken in connection with the accompanying drawings in which:

FIG. 1 is a perspective view of an automatic bottle finish testing machine provided with a height tester embodying my invention;

FIG. 4 is a diagrammatic illustration of the magnetic detection circuit of the machine;

FIG. 5 is a further enlarged view of a portion of the device as shown in FIG. 2; and FIG. 6 is a right hand end view of the device of FIG. 5.

Figure 1A:
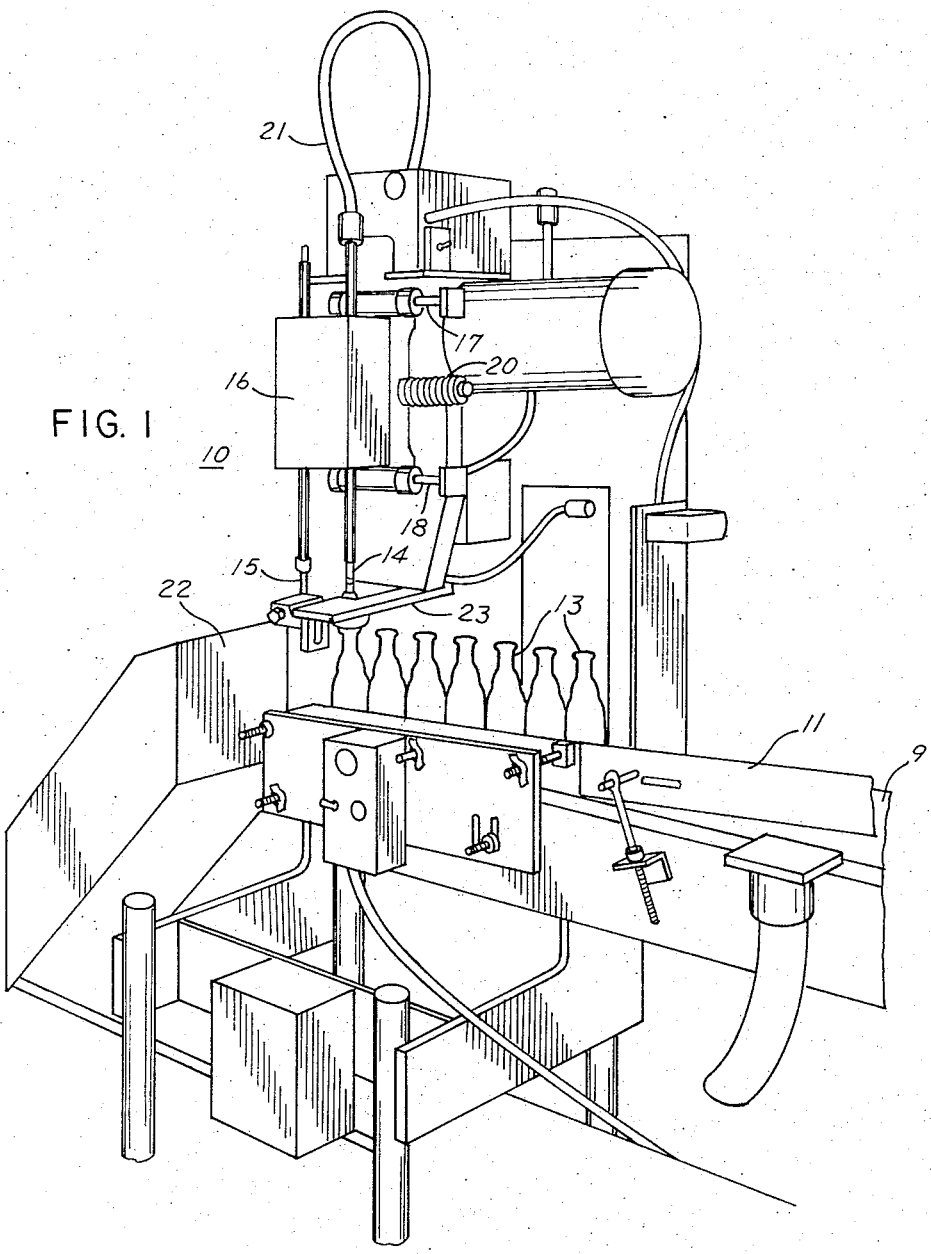
FIG. 1A is a plan view of a portion of the machine of FIG. 1.
Figure 1A:
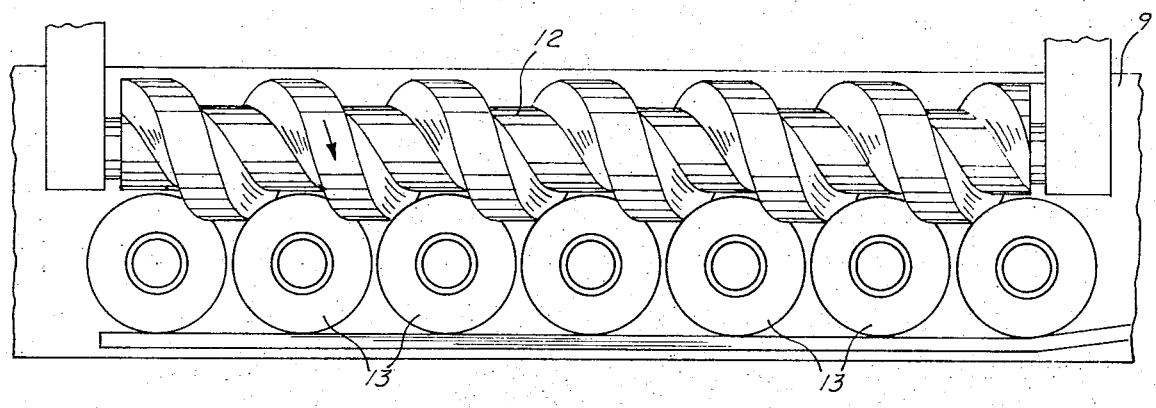

Referring now to the drawing, FIG. 1 illustrates a two spindle testing or gauging machine 10 which is positioned on a bottle production line which feeds bottles on a moving belt 9 toward the machine against a guard rail 11 and onto a guide track on the machine where the bottles are spaced evenly and are moved forward at a uniform rate by a power driven helical member 12 shown in FIG. 1A and which assures that the bottles, indicated at 13, will be in correctly spaced positions for meeting plungers 14 and 15 which test for seal finish and internal neck configuration, respectively. The two plungers are mounted in a drive assembly 16 which is mounted for lateral movement on upper and lower guides 17 and 18 against the pressure of the spring 20. In the machine illustrated, the production line is moving from right to left and the bottles illustrated are spaced in their required positions out of engagement with one another and at fixed equal intervals such that when a bottle reaches the position of the plunger 14, the plunger will move downwardly against the bottle and then move forwardly with the line for a predetermined stroke whereupon the plunger is withdrawn. The spaced bottles move forward, and when a bottle is in position below the plunger 15 the head of the plunger enters the neck of the bottle if the neck is smooth and of the required diameter. The plunger 14 carries the seal testing head, and when it is in engagement with the bottle, air pressure is applied through a conduit 21, and, in the event that the seal is imperfect, the leakage of air is utilized to actuate a mechanism to eject the bottle from the line when it reaches a chute 22. The ejector is on the far side of the machine as viewed in FIG. 1 and includes a plunger (not shown) which moves forward to push the bottle into the chute 22. The machine illustrated is essentially the same as the POWERS DUAL HEAD GAGER, a two spindle testing machine manufactured and sold by Powers Manufacturing, Inc. of 1140 Sullivan Street, Elmira, N.Y. This machine is illustrated as an example of the type of equipment on which my invention may be employed. During the operation of the machine the spindles 14 and 15 are held in their lower positions which may be determined by the heights and characteristics of the bottles during the lateral movement of the spindles along the line of bottles. At the end of this lateral stroke the spindles are again raised and the mechanism 14 returned to its position for lowering the spindles for engagement with the next bottle in alignment with each, the bottle just tested by the head 15 having moved forward and onto the conveyor line unless a bottle is rejected in which event it is moved into the chute 22.

In addition to the functions of gauging the interior neck of each bottle and the finish of the sealing surfaces thereof, the machine illustrated in FIG. 1 is provided with a mechanism for checking the height of the bottles and rejecting bottles which do not lie within the predetermined dimensional standards. This device includes a magnetic sensing element mounted on a bracket 23 adjacent the testing spindle 14.

Figure 2:
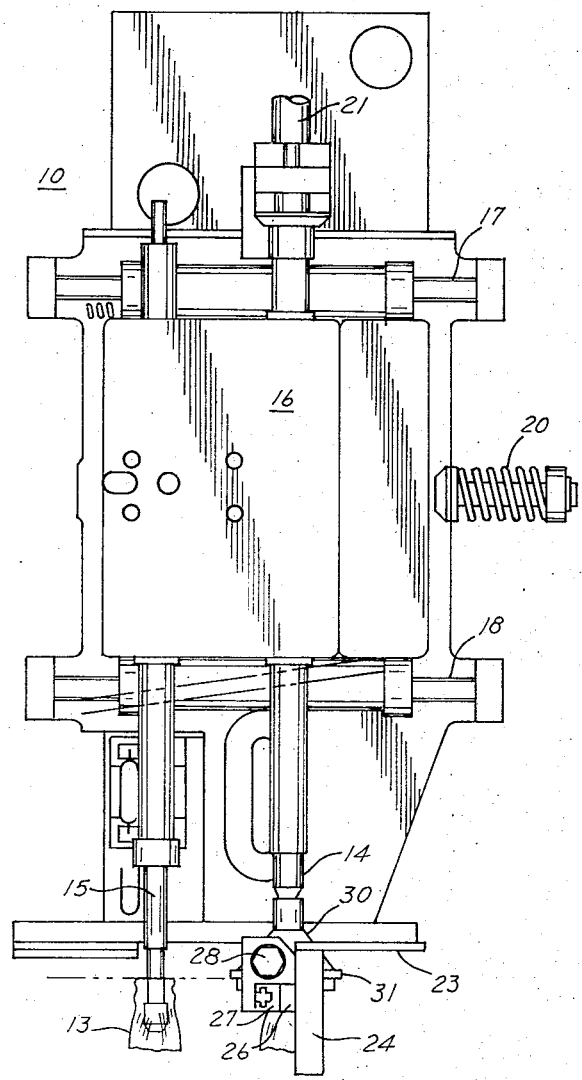
FIG. 2 is an enlarged front elevation view of a portion of the machine of FIG. 1 showing the height tester.
Figure 3:
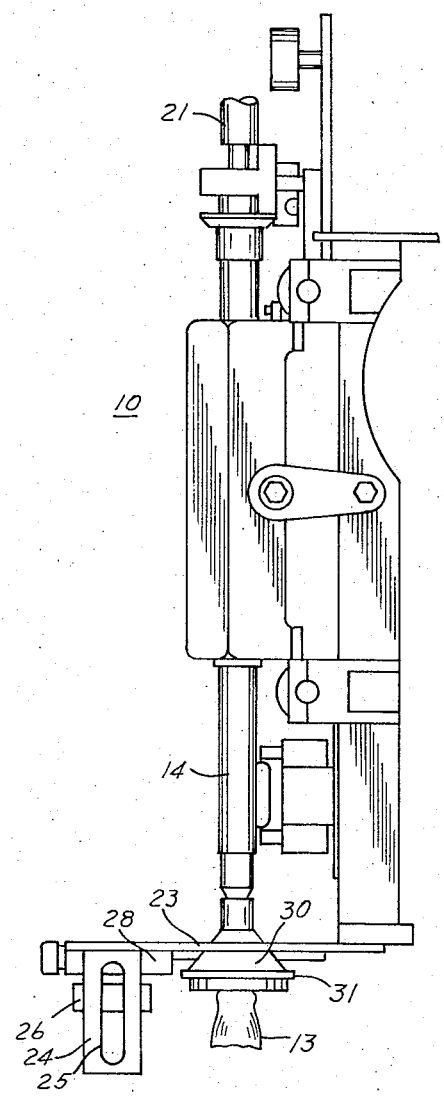
FIG. 3 is a right hand end elevation view of the portion shown in FIG. 2.

The details of the structure and mounting of the magnetic sensing unit are shown in FIGS. 2 and 3. These figures illustrate a gauging machine which is provided with a single magnetic sensing unit for detecting overheight bottles. The bracket 23 is secured rigidly to the frame of the machine 10 in any suitable manner. A downwardly extending support arm 24 having a longitudinal slot 25 is secured near the outer end of the bracket 23 and a cross member 26 is adjustably mounted on the arm 24 and carries a slide block 27 on which is mounted a magnetic detector or sensor 28 which extends longitudinally normal to the line of movement of the gauging spindle 14 and is positioned to the left of the center line of the spindle 14 when at its extreme right hand position. When the spindle moves downwardly, its conical head, indicated at 30, engages the top of a bottle as shown in FIG. 3, a seal within the head is pressed into engagement with the sealing surface of the bottle and air under pressure is supplied through the conduit 21 to test the finish of the sealing surface. In the event the seal is not perfect so that the pressure cannot be maintained, the ejecting mechanism is set to remove the bottle when it reaches the chute 22. After the head 30 has engaged the top of the bottle the spindle moves to the left while still engaging the bottle and moves past the magnetic detector 28. A ring of soft iron or other magnetic material 31 is mounted on the cone 30 at the lower maximum diameter portion thereof and, if the bottle is within the acceptable height, it moves past the detector 28 without activating the detector. If, however, the bottle is of excess height, ring 31 lies in the path of detector 28 near the central axis thereof and the detector is actuated by the change in the magnetic field produced by the presence of the ring 31 and the bottle ejector is prepared to remove the bottle 13 from the machine and discharge it into the chute 22 when the bottle reaches the ejector position. The details of construction of the machine 16 including the ejector mechanism are not necessary to an understanding of the present invention and have therefore not been shown in detail. It will be evident that as the ring 31 moves into the vicinity of the detector 28 and specifically when the nearest point of the ring is on the center line of the detector, the maximum effect is produced in the magnetic field and it is at this point that the detector is adjusted to effect an ejection of the bottle in the event of overheight.

The general arrangement of the detector system is indicated in FIG. 4 which is a diagrammatic illustration of the magnetic detection system. In the event that under-height bottles may be produced in a particular production system, the detector may be provided with an additional magnetic sensor 32 positioned directly below the sensor 28 to be responsive to the presence of the ring 31 when supported on an underheight bottle and which will actuate the circuit of the sensor 32 when it passes the sensor in its movement to the left as viewed in FIG. 2. Both the sensors 28 and 32 have been indicated as connected to a proximity pick-up unit 33 which includes circuitry utilized to produce an output signal when either detector, 28 or 32, senses the presence of the magnetic ring 31 in its immediate field. Separate magnetic sensors which are highly sensitive are known in the testing art and the details of the circuitry are not essential to an understanding of the present invention. By way of example, a suitable magnetic detecting apparatus for use with my invention is the proximity control sold under the trademark "MINI-PROX" by Electro Products Laboratories, Inc. of 6125 West Howard Street, Chicago, Ill. When either of the sensors 28 and 32 detects the presence of the ring 31, a signal is produced and supplied through a line 34 to a utilization device 35 which produces an output current sufficient to actuate a solenoid comprising a winding 36 and an armature 37 which may be the same winding and armature as that of an ejecting solenoid mechanism provided on the machine 10. Although, if desired, a separate and independent bottle ejecting control may be employed. Also separate pick-up units and detecting devices may be employed for the respective sensors 28 and 32.

By employing a highly sensitive magnetic detecting system the arrangement of a magnetic member such as the ring 31 on the spindle head 30 provides a reliable and accurate detecting system which in no way interferes with the operation of the testing machine 10. No contact with the moving parts of the machine is required and the magnetic control is highly satisfactory and well suited to continuous operation on a bottle production line. It will be noted that the magnetic ring concentric with the axis of the head assures the same minimum spacing between the ring and the probe should the head be turned about its axis.

In the event that the overheight and under-height sensors such as the sensors 28 and 33 are too large physically or are influenced magnetically by one another they may be located, by way of example, on diametrically opposite sides of the cone 30. Also, separate units 33 may be employed for each of the sensors 28 and 32.

The enlarged detailed views of FIGS. 5 and 6 illustrate more completely the positioning and arrangement of the magnetic sensor 28, dotted line positions of the mechanism being provided in order to indicate the extreme position of lateral movement of the spindles 14 and 15. In FIG. 6 the normal bottle height position of the conical head 30 is shown in full lines and a position when the head is in engagement with an overheight bottle is indicated in dotted lines.

As shown in FIG. 5, when the head 30 moves to the left, it passes the sensor 28 when it has moved about one fourth of the full distance of its lateral stroke. This position may be adjusted depending upon the characteristics of the gauging machine with which the sensing equipment is used. During the lateral movement the bottle in engagement with the head 30 moves with the head and, in the event that the bottle is of excess height, as indicated in FIG. 6, the sensor 28 detects the presence of the ring 31 and prepares the ejecting mechanism for ejecting the bottle from the production line as it passes the chute 22. During the operation of the head 30 to check the sealing surfaces of normal height bottles the head passes downwardly below the plane of the central axis of the magnetic sensor 28 while the cone 30 is in its extreme right hand position as viewed in FIG. 5. In this position the sensor is sufficiently spaced to one side of the ring 31 that no response results. Furthermore, as the ring 31 moves laterally with the cone 30 it is below the response level of the detector 28 and does not affect the detector because it is outside the axial sensing range of the detector even though it may be physically nearer. The magnetic sensors of the type suitable for this application have the characteristic that they are responsive to changes in the field along a relatively narrow axis or beam directly forward along the central axis of the sensor. These devices are capable of minute adjustment so that they may detect predetermined slight changes in the reluctance of the magnetic field adjacent the sensor. The adjustments may be made first by positioning the sensor mechanically in the desired location with respect to the path of the conical head 30 and second by adjusting the electronic circuits in the detecting unit 33.

While I have described my invention in connection with a specific embodiment as applied to a particular type of gauging equipment, various other modifications and applications will occur to those skilled in the art. Therefore, I do not desire my invention to be limited to the details of the embodiment illustrated, and I intend by the appended claims to cover all modifications which fall within the spirit and scope of my invention.

I claim:

1. In a machine for the continuous testing on a production line of bottles of substantially uniform size including means for moving the bottles in line at the same rate and at equal spacing and a test head for effecting a test of a bottle characteristic moved axially into engagement with each bottle in turn at a test position and moving laterally forward along the line in engagement with the top of the bottle for a predetermined stroke during the test period and then being withdrawn, and means positioned along the line of bottles for ejecting each defective bottle, a device for testing the height of each bottle in turn which comprises:

a magnetic probe mounted in a predetermined position on said machine and having a sensing axis transverse to the line of bottles and laterally forward of said test position within the length of said predetermined stroke, a magnetic member on the test head positioned to be spaced from said sensing axis of said probe when said test head moves laterally into engagement with a bottle having a predetermined acceptable height and said member lying in the path of said probe axis when said head engages a bottle having a predetermined different height during said stroke, said magnetic member being a ring mounted on said head concentrically about the central axis thereof whereby rotation of the head on its axis does not affect the minimum spacing between said member and said probe, and means responsive to the magnetic sensing of the proximity of said magnetic member for preparing and actuating said bottle ejecting means to eject the different height bottle from the line.

2. In a machine for the continuous testing on a production line of the seal finish of glass bottles of substantially uniform size including means for moving the bottles in line at the same rate and at equal spacing and a test head moved axially into engagement with the sealing surface of each bottle in turn at a test position and moving laterally forward along the line in engagement with the bottle for a predetermined stroke during the test period and then being withdrawn, and means positioned along the line of bottles for ejecting each defective bottle, a device for concurrently testing the height of each bottle in turn which comprises:

a magnetic probe mounted in a predetermined position on said machine and having a sensing axis transverse to the line of bottles and laterally forward of said test position within the length of said stroke, a magnetic member on the test head positioned to be spaced from the sensing axis of said probe when said test head moves laterally in engagement with a bottle having a height within a predetermined acceptable range of height and said member lying in the path of the sensing axis of said probe when said head is in engagement with a bottle having a height outside said range during said stroke, said magnetic member being of arcuate configuration concentric with the central axis of said head in a plane parallel to the direction of the lateral movement of said head whereby rotation of the head on its axis does not affect the minimum spacing between said member and said probe, and means responsive to the magnetic sensing of the proximity of said magnetic member for preparing and actuating said bottle ejecting means to eject the outside height bottle from the line.

3. The invention of claim 2 wherein said arcuate magnetic member is a ring mounted on said head concentric about the central axis thereof.

4. In a machine for the continuous testing on a production line of the seal finish of glass bottles of substantially uniform size including means for moving the bottles in line at the same rate and at equal spacing and a test head moved axially into engagement with the sealing surface of each bottle in turn at a test position and moving laterally forward along the line in engagement with the bottle for a predetermined stroke during the test period and then being withdrawn, and means positioned along the line of bottles for ejecting each defective bottle, a device for concurrently testing the height of each bottle in turn which comprises:

a magnetic probe mounted in a predetermined position on said machine laterally forward of said test position within the length of said stroke, a magnetic member on the test head positioned to be spaced from the sensing axis of said probe when said test head moves laterally in engagement with a bottle having a height within a predetermined acceptable range of height and said member lying in the path of said probe when said head is in engagement with a bottle having a height outside said range during said stroke, said test head including a fluid pressure sealing hood of circular cross section for sealing engagement with the bottle and said magnetic ring member being mounted on the outside of said hood at the greatest diameter thereof, and means responsive to the magnetic sensing of the proximity of said magnetic member for preparing and actuating said bottle ejecting means to eject the different height bottle from the line.

5. The invention of claim 4 wherein the exterior of said hood is in the configuration of an upright cone whereby said magnetic ring is positioned about the base of the cone.

6. The invention of claim 1 including means for adjusting the position of said probe in accordance with the height of the bottles to be tested.

* * * * *